(12) United States Patent
Henderson et al.

(10) Patent No.: US 6,757,592 B1
(45) Date of Patent: Jun. 29, 2004

(54) NONLINEAR FAN CONTROL

(75) Inventors: Richard Dean Henderson, Sunnyvale, CA (US); Mehmet Aslan, Milpitas, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 21 days.

(21) Appl. No.: 10/260,454

(22) Filed: Sep. 30, 2002

(51) Int. Cl.[7] .............................................. G05D 23/00
(52) U.S. Cl. ..................... 700/299; 361/695; 702/130
(58) Field of Search ............................... 700/299, 300, 700/278; 702/130, 132, 136; 361/676, 687, 688, 695

(56) References Cited

U.S. PATENT DOCUMENTS

| | | | |
|---|---|---|---|
| 6,363,490 B1 * | 3/2002 | Senyk .......................... | 713/300 |
| 2002/0016656 A1 * | 2/2002 | Chung et al. .................. | 701/36 |
| 2003/0120394 A1 * | 6/2003 | Ziarnik ........................ | 700/300 |
| 2003/0128509 A1 * | 7/2003 | Oudet .......................... | 361/687 |
| 2003/0236594 A1 * | 12/2003 | Frankel et al. ............... | 700/300 |
| 2003/0236595 A1 * | 12/2003 | Frankel et al. ............... | 700/300 |

* cited by examiner

*Primary Examiner*—Leo Picard
*Assistant Examiner*—Zoila Cabrera
(74) *Attorney, Agent, or Firm*—Mark R. Hennings; Merchant & Gould

(57) ABSTRACT

A circuit is arranged to limit the rate of change in fan speed control signals. The control system includes a controller that produces a nonlinear (or piecewise linear approximation of a nonlinear function) fan speed control signal. The nonlinear fan speed control signal can reduce unnecessarily large changes in the fan speed and provide a greater degree of control at higher temperatures. Linear changes in the speed of a fan often result in audible noises that are undesirably distracting. Controlling the fan by using nonlinear exponential step sizes advantageously reduces the apparent fan noise by linearly varying the amount of fan noise in approximately equal percentages between each programmed fan speed. The step sizes are nonlinear with respect to temperature change and are linear with respect to fan noise.

23 Claims, 7 Drawing Sheets

NONLINEAR FAN CONTROL

FIELD OF THE INVENTION

The present invention relates generally to control systems, and more particularly to providing nonlinear control of a fan for temperature controlled systems.

BACKGROUND OF THE INVENTION

Intelligent system temperature control is an important consideration for many electronic systems, including systems such as personal computers. Such systems can be designed to vary the speed of a fan to regulate the temperature of the system. The speed of the fan is controlled by measuring a temperature of the system, selecting a desired fan speed in accordance with the measured temperature, and signaling the fan driver with a signal that conveys the target fan speed. Changes in the fan speed result in audible changes in the sound generated by the fan.

SUMMARY OF THE INVENTION

The present invention is directed towards a nonlinear fan control system for limiting the rate of change in fan speed control signals. The control system includes a controller that produces a nonlinear (or piecewise linear approximation of a nonlinear function) fan speed control signal. The nonlinear fan speed control signal can reduce unnecessarily large changes in the fan speed and provide a greater degree of control at higher temperatures. Linear changes in the speed of a fan often result in audible noises that are undesirably distracting. Controlling the fan by using nonlinear exponential step sizes advantageously reduces the apparent fan noise by linearly varying the amount of fan noise in approximately equal percentages between each programmed fan speed. The step sizes are nonlinear with respect to temperature change and are linear with respect to fan noise.

A more complete appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
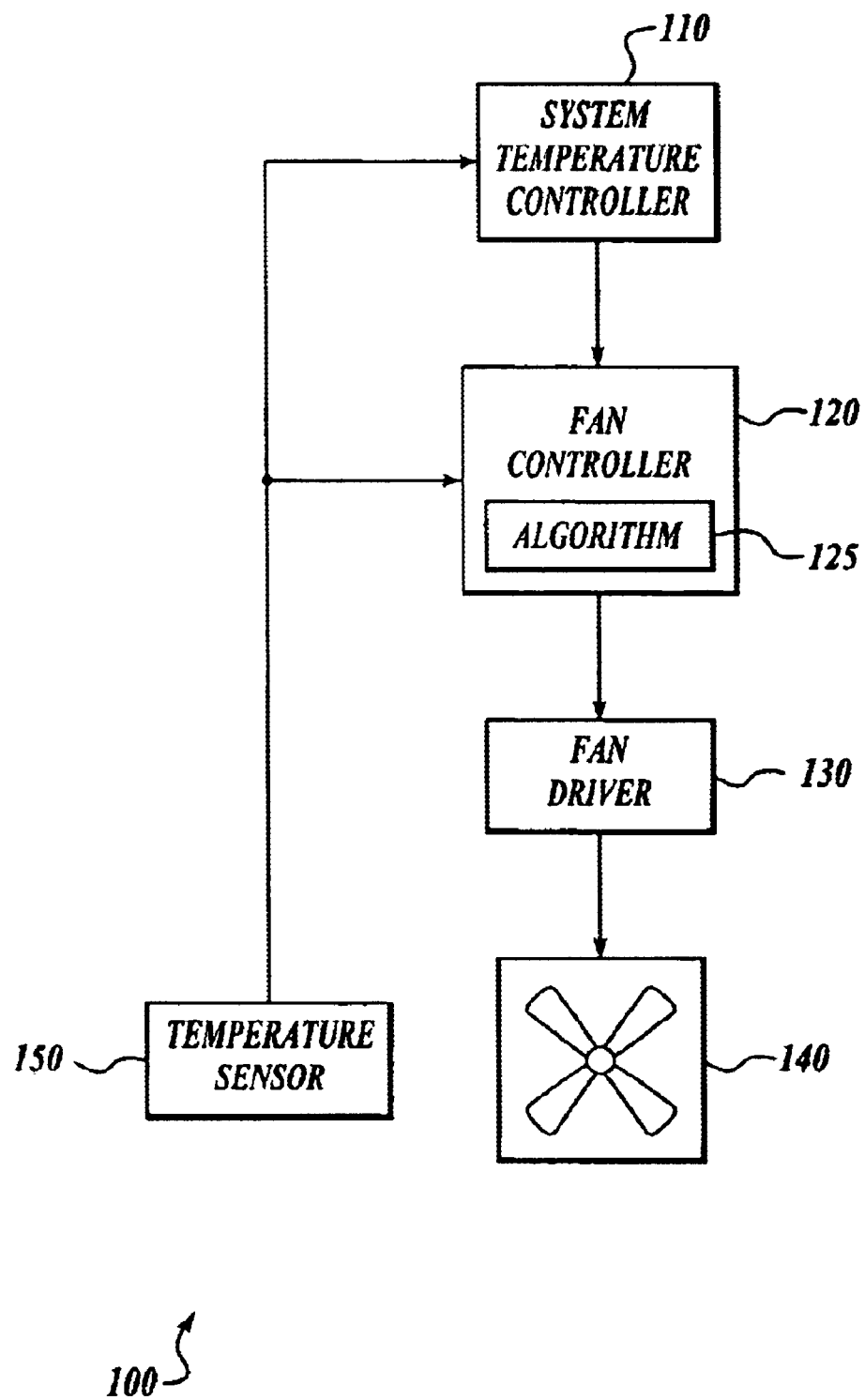
FIG. 1 shows a schematic of an example of a nonlinear fan control system in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. The term "nonlinear" means pertaining to a function such as an exponential function, or a function that approximates an exponential function. Referring to the drawings, like numbers indicate like parts throughout the views.

The present invention is directed towards a nonlinear fan control system for limiting the rate of change in fan speed control signals. The control system includes a controller that produces a nonlinear (or piecewise linear approximation of a nonlinear function) fan speed control signal. The nonlinear fan speed control signal can reduce unnecessarily large changes in the fan speed and provide a greater degree of control at higher temperatures. Linear changes in the speed of a fan often result in audible noises that are undesirably distracting. Controlling the fan by using nonlinear exponential step sizes advantageously reduces the apparent fan noise by linearly varying the amount of fan noise in approximately equal percentages between each programmed fan speed. The step sizes are nonlinear with respect to temperature change and are linear with respect to fan noise.

The noise level of a fan is increased (or decreased) by a coefficient that is 50 times the logarithm (base 10) of the ratio of a first speed to a second speed:

$$N_2 - N_1 = 50 \times \log_{10} \frac{rpm_2}{rpm_1}, \text{ where} \tag{I}$$

$N_2$ is the new noise level, $N_1$ is the original noise level, $rpm_2$ is the new fan speed, and $rpm_1$ is the original fan speed.

FIG. 1 is a schematic of an example of a nonlinear fan control system in accordance with the present invention. As shown in the figure, system 100 includes System Temperature Controller 110, Fan Controller 120, Fan Driver 130, fan 140, and Temperature Sensor 150. Fan Controller 120 includes algorithm 125.

System Temperature Controller 110 is coupled to Fan Controller 120 and Temperature Sensor 150. Fan Controller 120 is coupled to Fan Driver 130 and Temperature Sensor 150. Fan Driver 130 is coupled to fan 140.

System Temperature Controller 110 may be formed by using discrete components or by using a combination of hardware and algorithms (software). System Temperature Controller 110 may include a processor such as a microcontroller, microprocessor, state machine, combinatorial logic, a combination of these, and the like. System Temperature Controller 110, Fan Controller 120, Fan Driver 130, and Temperature Sensor 150 may be implemented on the same integrated circuit or on a combination of different integrated circuits.

Temperature Sensor 150 is arranged to measure a temperature at a temperature control point (TCP) within the system. The TCP is a physical location that represents a location in a system where temperature control is desired. The TCP may be located, for example, in an integrated circuit (such as a CPU) or other point in a system. Temperature Sensor 150 may be any temperature-measuring device. For example, Temperature Sensor 150 may be implemented as a diode in a substrate of an integrated circuit or as a stand-alone transistor.

System Temperature Controller 110 determines a target speed for fan 140 in response to the monitored temperature reading. The temperature is typically monitored every tenth of a second by System Temperature Controller 110, although faster and slower rates are possible. Higher fan speeds are typically used for higher monitored temperatures. The determined target speed is a linear function of the monitored temperature reading. The determined target speed is optionally transmitted to Fan Controller 120.

Fan Controller 120 calculates a nonlinear response to the target fan speed control signal and/or the monitored temperature reading. The nonlinear fan speed control signal typically is an exponential function (or an approximation of an exponential function). Fan Controller 120 includes at least one Algorithm 125, which determines a nonlinear fan speed in response to the target fan speed and/or the monitored temperature reading. Algorithm 125 is more fully described below with respect to FIG. 2.

Fan driver 130 is coupled to the nonlinear fan speed control signal. Fan Driver 130 controls the speed of fan 140. Fan Driver 130 can be used to buffer the fan speed control signal for the purpose of driving fan 140.

Figure 2:
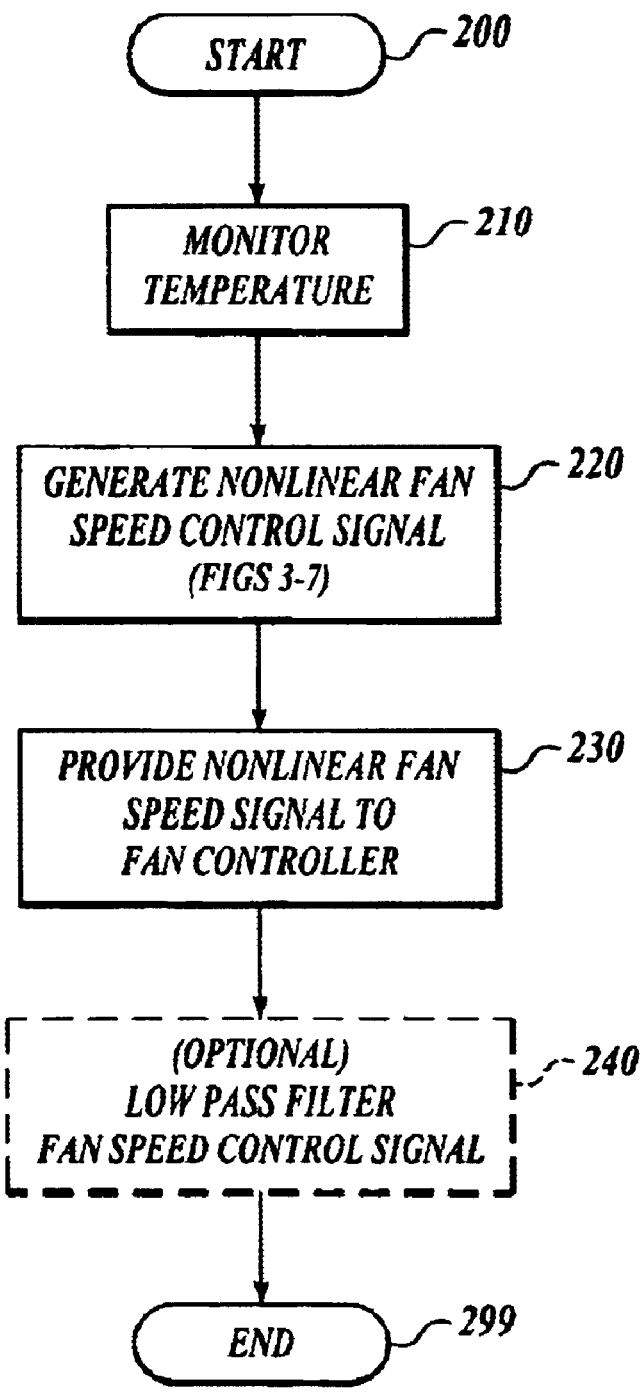
FIG. 2 shows a flow diagram of an example method for providing nonlinear control for a fan in accordance with the present invention.

FIG. 2 shows a flow diagram of an example method for providing nonlinear control for a fan in accordance with the present invention. Method 200 is invoked approximately every tenth of a second, although faster and slower rates are possible.

In step 210, a temperature of a TCP is monitored within a system.

In step 220, a nonlinear fan speed control signal for the fan is generated in response to the monitored temperature. The nonlinear fan speed control signal is approximately related to noise of the fan in a linear fashion (as described above in Equation I). FIGS. 3–7 described below illustrate various techniques for calculating a nonlinear response to the target fan speed control signal.

Figure 3:
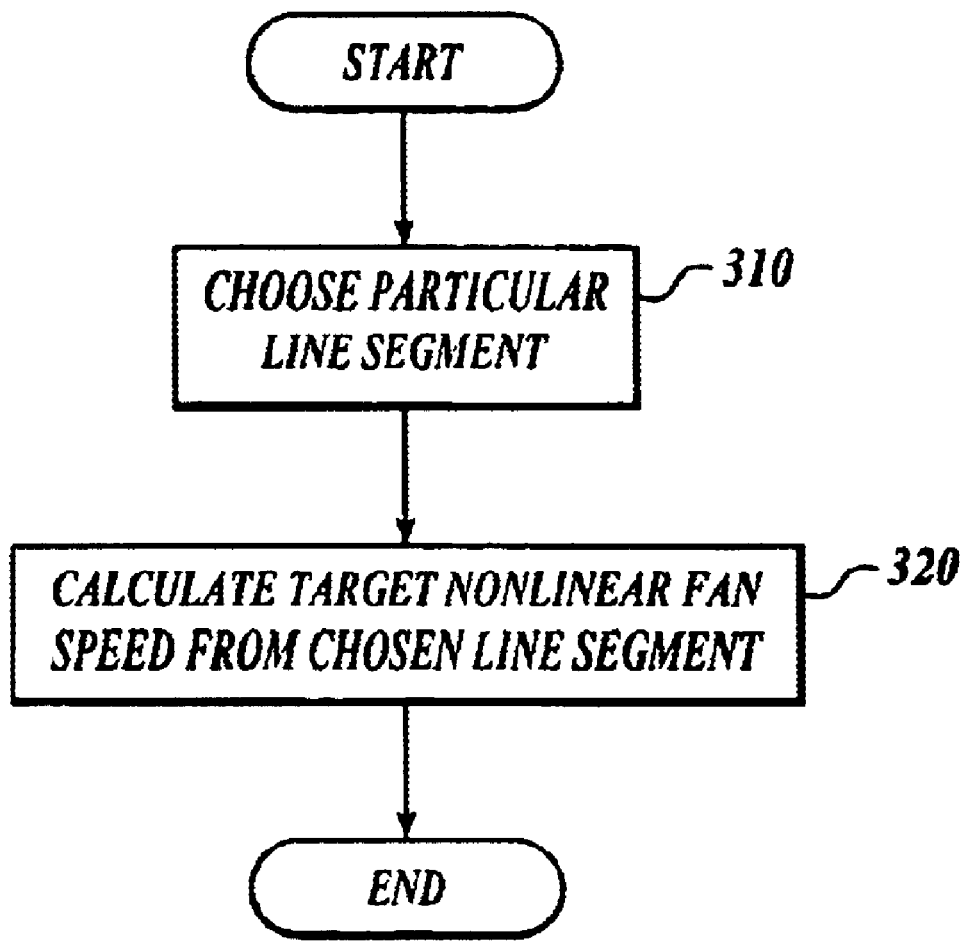
FIG. 3 shows a flow diagram of an example piecewise linear approximation technique that is used to provide a nonlinear fan speed control signal in response to the monitored temperature in accordance with the present invention.

FIG. 3 shows a flow diagram of an example piecewise linear approximation technique that is used to provide a nonlinear fan speed control signal in response to the monitored temperature in accordance with the present invention. In this technique, an exponential curve (which represents the ideal, nonlinear response) is approximated by fitting the exponential curve with a plurality of line segments. Each line segment has endpoints on the exponential curve, has a single slope, and extends over a subrange of temperatures for which a response is desired.

In step 310, a particular line segment (that has a temperature range that encompasses the monitored temperature) is chosen in response to the monitored temperature.

In step 320, a technique such as linear interpolation is used to calculate a value that lies on the line segment, such that the value corresponds to the monitored temperature. The calculated value represents the target nonlinear fan speed, which is conveyed by the nonlinear fan speed control signal.

Figure 4:
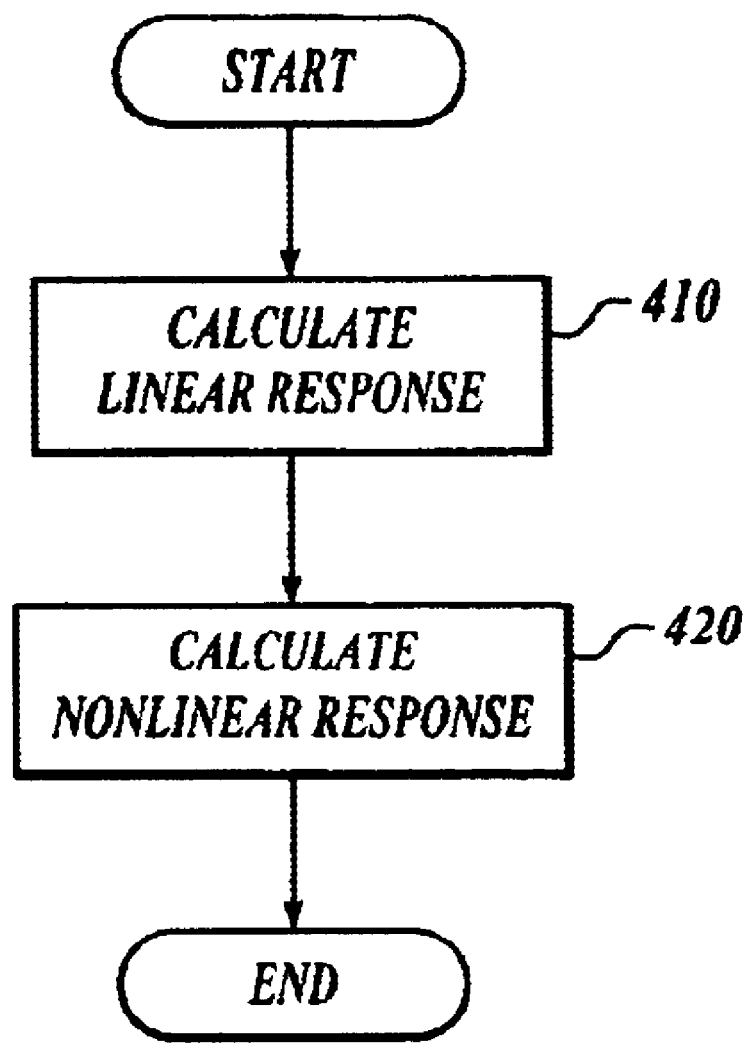
FIG. 4 shows a flow diagram of an example exponential function that is used to provide a nonlinear fan speed control signal in response to the monitored temperature in accordance with the present invention.

FIG. 4 shows a flow diagram of an example exponential function that is used to provide a nonlinear fan speed control signal in response to the monitored temperature in accordance with the present invention.

In step 410, the monitored temperature is converted to a percentage of an expected temperature range (where 100% is the highest expected temperature and 0% is the lowest expected temperature). The temperature percentage represents a linear response to the monitored temperature.

In step 420, the linear response is converted to a nonlinear response according to the formula $$\text{nonlinear} = 2^{(range-\Delta T)} \times \text{linear} \times \frac{1}{2^{range}}$$

where nonlinear is the nonlinear response, range is the range of expected temperatures, linear is the linear response, and $\Delta T$ is the monitored temperature minus the lowest expected temperature. The nonlinear response represents the target nonlinear fan speed, which is conveyed by the nonlinear fan speed control signal.

Figure 5:
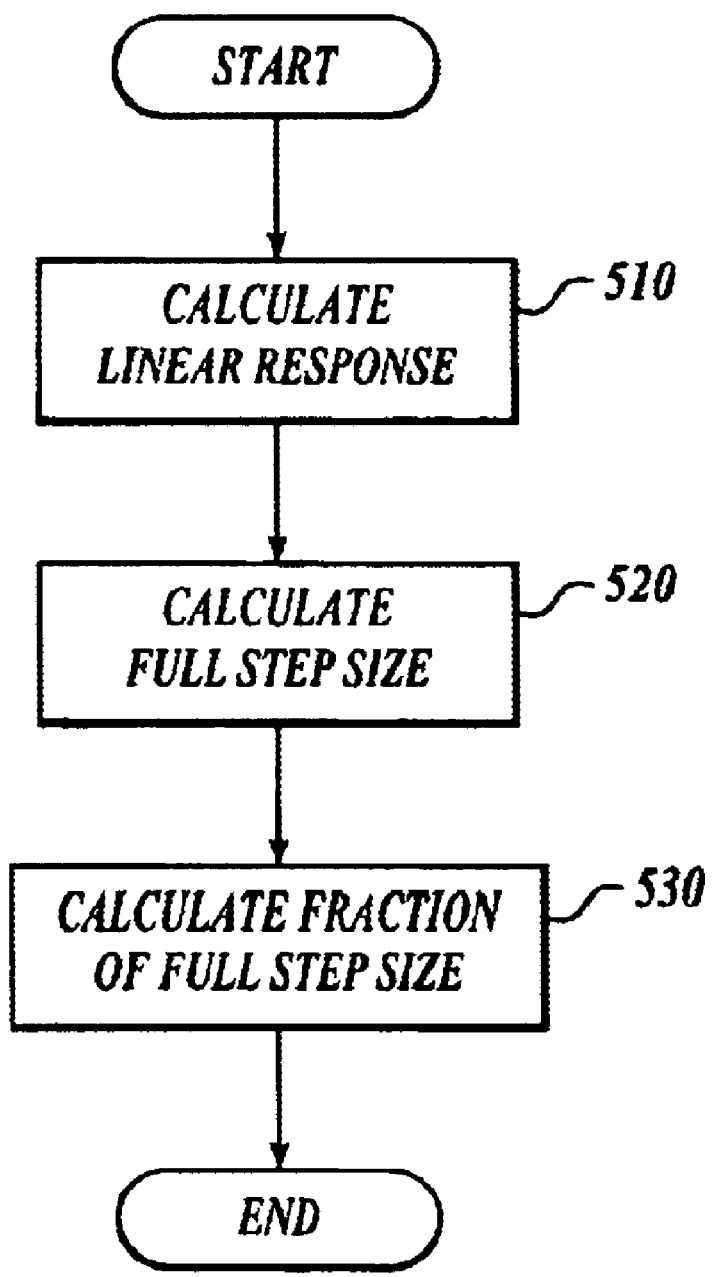
FIG. 5 shows a flow diagram of an example successive fraction technique that is used to provide a nonlinear fan speed control signal in response to the monitored temperature in accordance with the present invention.

FIG. 5 shows a flow diagram of an example successive fraction technique that is used to provide a nonlinear fan speed control signal in response to the monitored temperature in accordance with the present invention. In this technique, a divisor (that is typically a power of 2) is selected that represents denominator of a step fraction. The step fraction represents the fraction by which the nonlinear response is allowed to change in response to the instant calculated linear response.

In step 510, the monitored temperature is converted to a percentage of an expected temperature range (which is the instant calculated linear response).

In step 520, a full step size is calculated by subtracting the instant calculated linear response from the previous calculated linear response (which is determined from the most recent, previous monitored temperature).

In step 530, a fraction of the full step size can be calculated by multiplying the full step size by a step fraction. The fraction of the full step size becomes the new nonlinear response. When the technique is successively applied to a monitored temperature that increases at a constant rate, the step size becomes greater and greater, which approximates an exponential curve.

Figure 6:
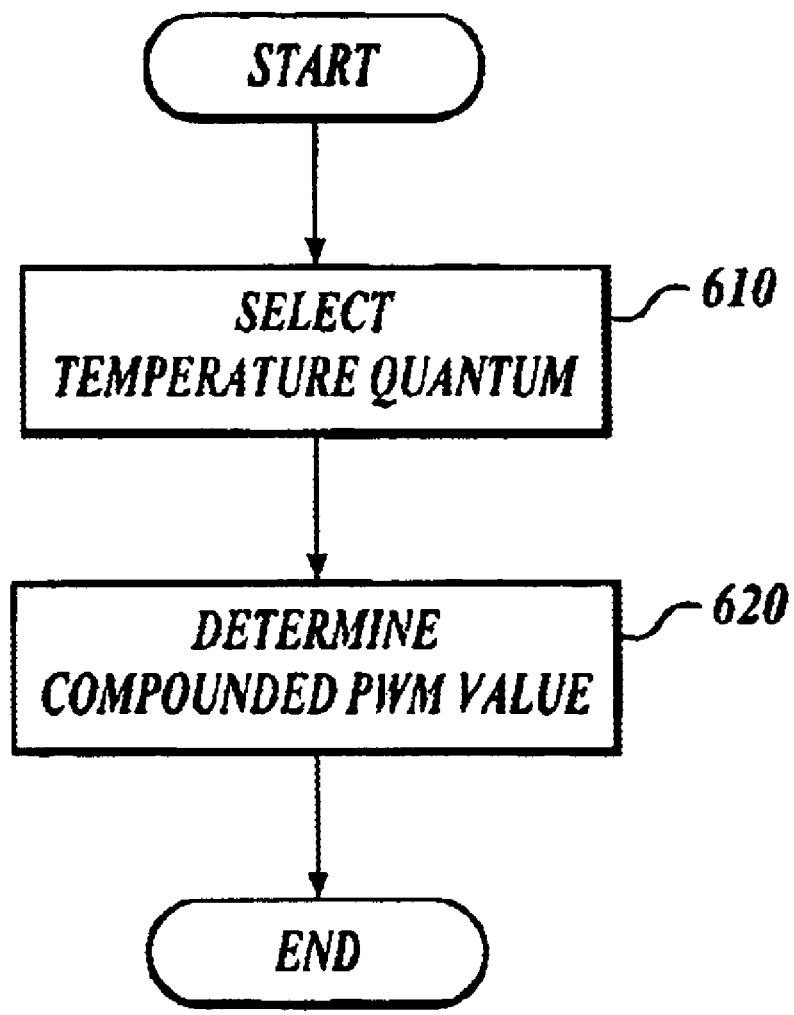
FIG. 6 shows a flow diagram of an example compounding technique that is used to provide a nonlinear fan speed control signal in response to the monitored temperature in accordance with the present invention.

FIG. 6 shows a flow diagram of an example compounding technique that is used to provide a nonlinear fan speed control signal in response to the monitored temperature in accordance with the present invention. In this technique, a constant rate of increase of the nonlinear response for each quantum of temperature is selected. The constant rate of increase may be selected to contain fractional powers of two such that a multiplier can be easily implemented by using binary shifters and adders. For example, using a constant rate of increase of 1.0625% results in 19 quanta between a PWM of 80 and 255, with each quantum having a PWM value that is 1.0625% greater than its preceding PWM value. The example series contains the PWM values 80, 85, 90, 96, 102, 108, 115, 122, 130, 138, 147, 156, 166, 176, 187, 198, 211, 224, 238, and 253.

In step 610, a temperature quantum is selected for the monitored temperature. The temperature quantum has an ordinal number that corresponds to the ordering by value of the temperature quanta.

In step 620, a starting PWM value is compounded by the rate of increase by a number of times that corresponds to the ordinal number of the selected temperature quantum. The result of the compounding is a (nonlinear) PWM value, which is conveyed by the nonlinear fan speed control signal.

Figure 7:
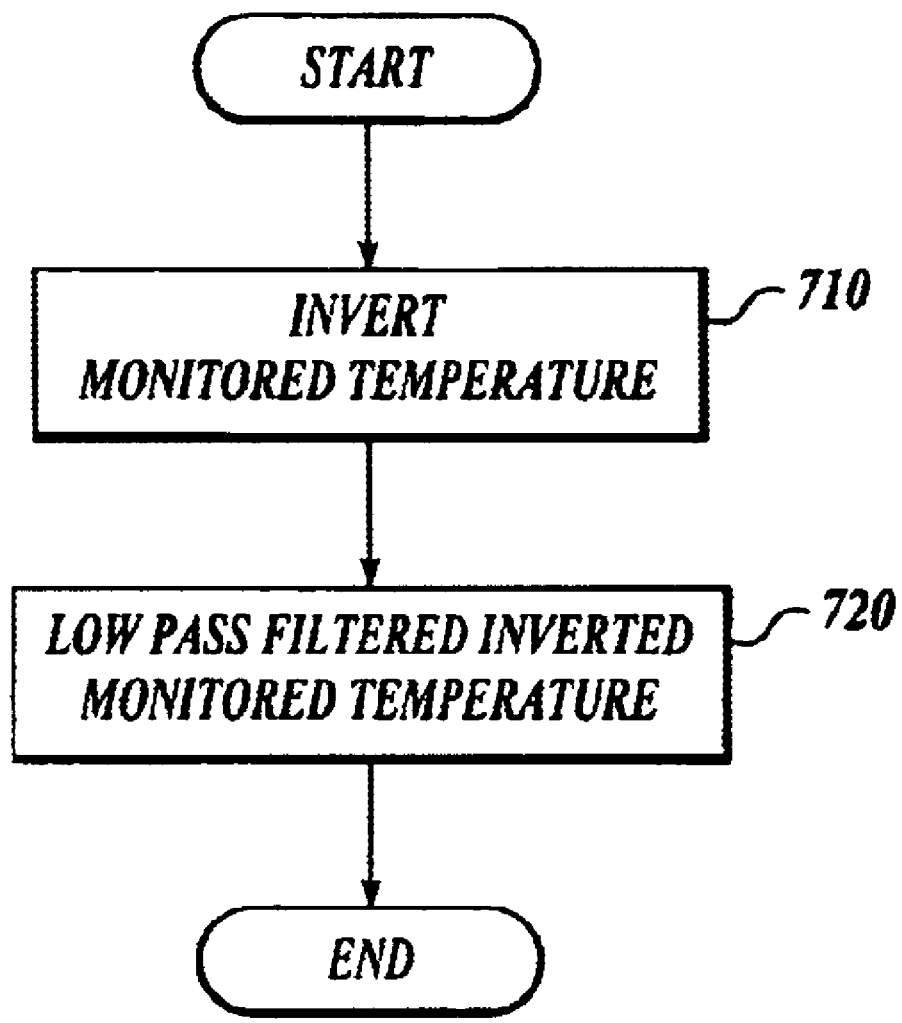
FIG. 7 shows a flow diagram of an example low pass filter algorithm that is used to provide a nonlinear fan speed control signal in accordance with the present invention.

FIG. 7 shows a flow diagram of an example low pass filter algorithm that is used to provide a nonlinear fan speed control signal in accordance with the present invention. The function can be inverted with respect to the independent variable x (which represents temperature) to provide an increasing exponential. The monitored temperature can be inverted by subtracting the monitored temperature from the maximum expected temperature. The inverted monitored temperature is applied to the low pass filter algorithm, which provides an exponential response to the monitored temperature.

An example FIR filter is defined by the equation $y(n)=0.75*y(n-1)+0.25*x(n)$, where the index n is the inverted, monitored temperature. The nonlinear fan speed control signal is quantified as a PWM signal, and is bounded at 100% (PWMmax) and 40% (PWMmin). The maximum temperature (Tmax) is set to 70° C. Index n is defined as Tmax minus the monitored temperature. Index n has a terminal count of 25 (which results in a temperature range of 70°–45° C.). The output of the example filter is shown below in Table 1.

TABLE 1

| Temperature | n | Fan Speed ($\gamma$) | REG VALUE |
|---|---|---|---|
| 70 | 0 | 100.0% | 255 |
| 69 | 1 | 85.0% | 217 |
| 68 | 2 | 73.8% | 188 |
| 67 | 3 | 65.3% | 167 |
| 66 | 4 | 59.0% | 150 |
| 65 | 5 | 54.2% | 138 |
| 64 | 6 | 50.7% | 129 |
| 63 | 7 | 48.0% | 122 |
| 62 | 8 | 46.0% | 117 |
| 61 | 9 | 44.5% | 113 |
| 60 | 10 | 43.4% | 111 |
| 59 | 11 | 42.5% | 108 |
| 58 | 12 | 41.9% | 107 |
| 57 | 13 | 41.4% | 106 |
| 56 | 14 | 41.1% | 105 |
| 55 | 15 | 40.8% | 104 |
| 54 | 16 | 40.6% | 104 |
| 53 | 17 | 40.5% | 103 |
| 52 | 18 | 40.3% | 103 |
| 51 | 19 | 40.3% | 103 |
| 50 | 20 | 40.2% | 102 |
| 49 | 21 | 40.1% | 102 |
| 48 | 22 | 40.1% | 102 |
| 47 | 23 | 40.1% | 102 |
| 46 | 24 | 40.1% | 102 |
| 45 | 25 | 40.0% | 102 |

The calculations can be incrementally calculated (i.e., based upon the result calculated for the last previously monitored temperature) or be calculated from an initial count (e.g., 0) or a terminal count (e.g., 25) of index n for each monitored temperature reading. Additionally, at temperatures above a first threshold (e.g., 70° C.) the fan can be set to run at full speed, and at temperatures below a second threshold (e.g., 55° C.) the fan speed can be set to, for example, a fixed value of 40% or simply turned off.

In step 710, the monitored temperature is inverted by subtracting the monitored temperature from a maximum temperature.

In step 720, the inverted monitored temperature is applied to a low pass filter function to determine an exponential response, which is conveyed by the nonlinear fan speed control signal.

In step 230 (referring again to FIG. 3), the nonlinear fan speed control signal for the fan is provided to a fan controller. The fan controller can control the speed of a fan by, for example, producing a PWM signal that has a duty ratio that is determined by the nonlinear fan speed control signal.

In step 240, the output nonlinear fan speed control signal can be optionally low pass filtered to provide additional smoothing of the nonlinear fan speed control signal. Such a technique is described in a patent application 50019.0138US01, which is incorporated by reference in its entirety.

Other embodiments of the invention are possible without departing from the spirit and scope of the invention. For example, algebraic manipulations of the above-mentioned formulas and algorithms may be used to provide the same (or similar) results as disclosed above. Likewise, fan control mechanisms other than PWM can be used to achieve similar results.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A circuit for nonlinear fan control, comprising:
   a system temperature controller that is configured to produce a target fan speed control signal in response to a measured system temperature, wherein the target fan speed control signal is linearly related to the measured system temperature;
   a fan controller that is configured to produce a nonlinear fan speed control signal in response to one of a temperature signal and the target fan speed signal, wherein the nonlinear fan speed control signal is linear with respect to noise produced by the fan and is nonlinear with respect to the measure system temperature; and
   a fan driver that is configured to receive the nonlinear fan speed control and drive the fan in response.

2. The circuit of claim 1, wherein the fan controller comprises an algorithm that is configured to provide a piecewise approximation of a nonlinear response.

3. The circuit of claim 1, wherein the fan controller comprises an algorithm that is configure to provide a nonlinear response according to the formula $$\text{nonlinear} = 2^{(range-\Delta T)} \times \text{linear} \times \frac{1}{2^{range}}.$$

4. The circuit of claim 1, wherein fan controller comprises an algorithm that is configured to provide a successive fraction approximation of a nonlinear response.

5. The circuit of claim 1, wherein the fan controller comprises an algorithm that is configured to provide a compounding of temperature quanta approximation of a nonlinear response.

6. The circuit of claim 1 wherein the fan controller comprises an algorithm that is configured to provide a low pass filter approximation of a nonlinear response.

7. The circuit of claim 6 wherein the algorithm is further configured to invert a monitored temperature.

8. A circuit for providing nonlinear control of a fan, comprising:

means for producing a target fan speed control signal in response to a measured system temperature, wherein the target fan speed control signal is linearly related to the measured system temperature;

means for producing a nonlinear fan speed control signal in response to the target fan speed signal, wherein the nonlinear fan speed control signal is linear with respect to noise produced by the fan and is nonlinear with respect to the measure system temperature; and means for driving the fan in response to the nonlinear fan speed control signal.

9. The circuit of claim 8, wherein the means for producing the nonlinear fan speed control signal comprises means for calculating a piecewise approximation of a nonlinear response.

10. The circuit of claim 8, wherein the means for producing the nonlinear fan speed control signal comprises means for calculating a response according to the formula $$\text{nonlinear} = 2^{(range-\Delta T)} \times \text{linear} \times \frac{1}{2^{range}}.$$

11. The circuit of claim 8, wherein the means for producing the nonlinear fan speed control signal comprises means for calculating a piecewise approximation of a nonlinear response.

12. The circuit of claim 8, wherein the means for producing the nonlinear fan speed control signal comprises means for calculating a successive fraction approximation of a nonlinear response.

13. The circuit of claim 8, wherein the means for producing the nonlinear fan speed control signal comprises means for calculating a temperature quanta approximation of a nonlinear response.

14. The circuit of claim 8, wherein the means for producing the nonlinear fan speed control signal comprises means for calculating a low pass filter approximation of a nonlinear response.

15. The circuit of claim 8, wherein the means for producing the nonlinear fan speed control signal comprises means for calculating a low pass filter approximation of a nonlinear response, wherein the low pass filter is configured to invert the monitored temperature to produce an index.

16. A method for providing nonlinear control of a fan, comprising:

producing a target fan speed control signal in response to a measured system temperature, wherein the target fan speed control signal is linearly related to the measured system temperature;

producing a nonlinear fan speed control signal in response to the target fan speed signal, wherein the nonlinear fain speed control signal is linear with respect to noise produced by the fan and is nonlinear with respect to the measure system temperature; and driving the fan in response to the nonlinear fan speed control signal.

17. The method of claim 16, wherein the nonlinear fan speed control signal is produced using piecewise approximation of a nonlinear response.

18. The method of claim 16, wherein the nonlinear fan speed control signal is produced using the formula $$\text{nonlinear} = 2^{(range-\Delta T)} \times \text{linear} \times \frac{1}{2^{range}}.$$

19. The method of claim 16, wherein the nonlinear fan speed control signal is produced using a piecewise approximation of a nonlinear response.

20. The method of claim 16, wherein the nonlinear fan speed control signal is produced using a successive fraction approximation of a nonlinear response.

21. The method of claim 16, wherein the nonlinear fan speed control signal is produced using a temperature quanta approximation of a nonlinear response.

22. The method of claim 16, wherein the nonlinear fan speed control signal is produced using a low pass filter approximation of a nonlinear response.

23. The method of claim 16, wherein the nonlinear fan speed control signal is produced using a low pass filter approximation of a nonlinear response, wherein the low pass filter inverts the monitored temperature to produce an index.

* * * * *

UNITED STATES PATENT AND TRADEMARK OFFICE
CERTIFICATE OF CORRECTION

PATENT NO. : 6,757,592 B1  
DATED : June 29, 2004  
INVENTOR(S) : Richard Dean Henderson et al.

It is certified that error appears in the above-identified patent and that said Letters Patent is hereby corrected as shown below:

<u>Title page,</u>
Item [*] Notice, "U.S.C. 154(b) bydays.days." should read -- U.S.C. 154(b) by 21 days. --

<u>Column 6,</u>
Line 56, change "configure" to -- configured --.

Signed and Sealed this

Twenty-eighth Day of June, 2005

JON W. DUDAS  
*Director of the United States Patent and Trademark Office*